June 22, 1948.  G. D. FERGUSON  2,443,611
LOW BED TRAILER
Filed Dec. 7, 1945  3 Sheets-Sheet 1
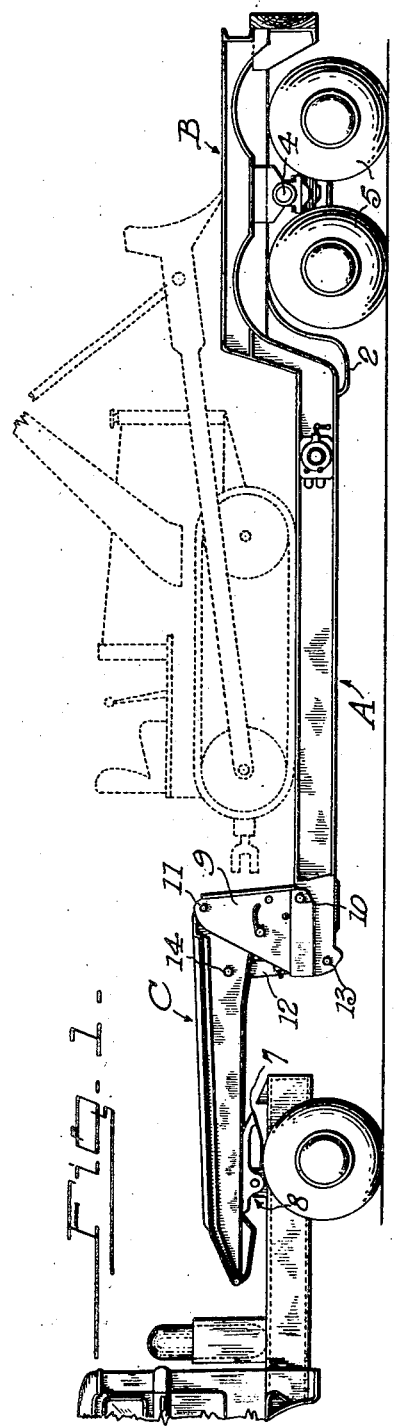
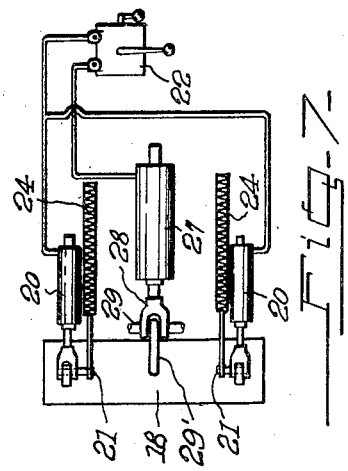
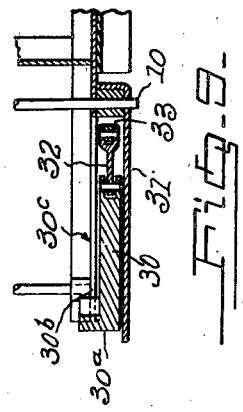
INVENTOR
GLENN D. FERGUSON
BY
ATTORNEYS

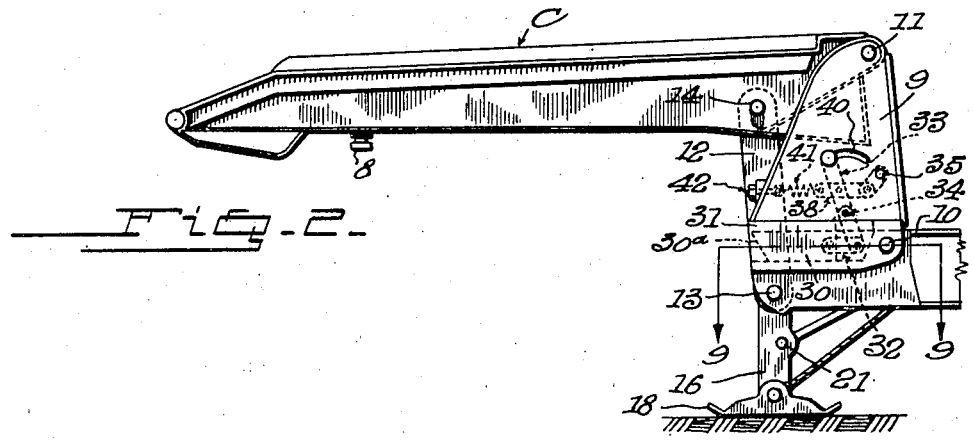
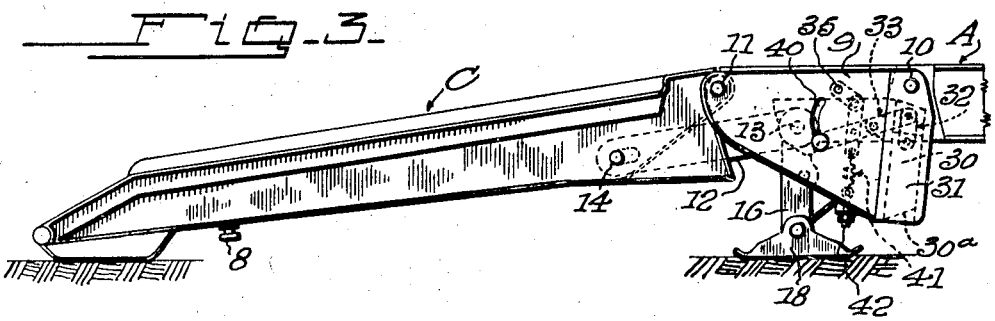
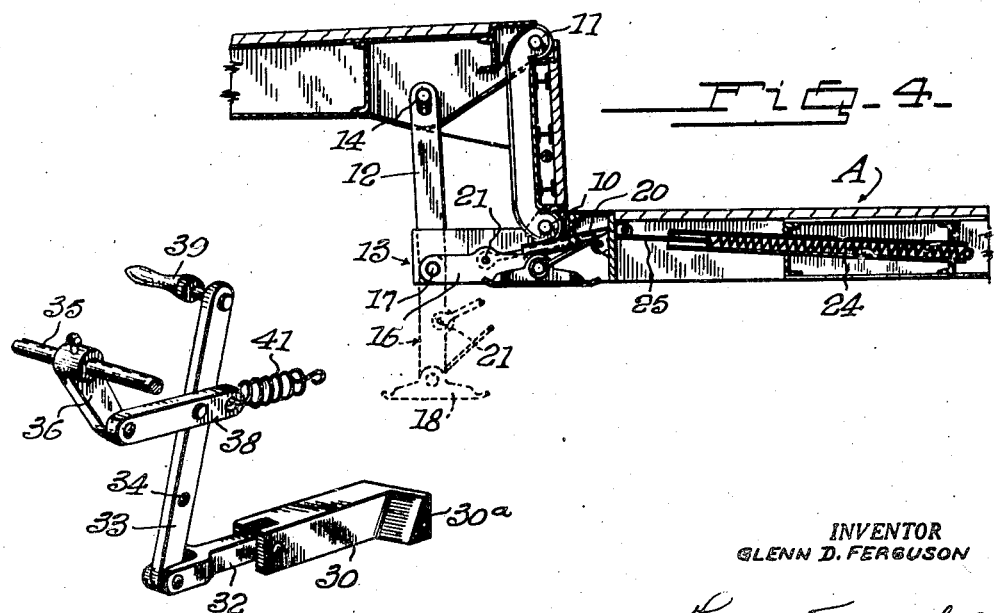

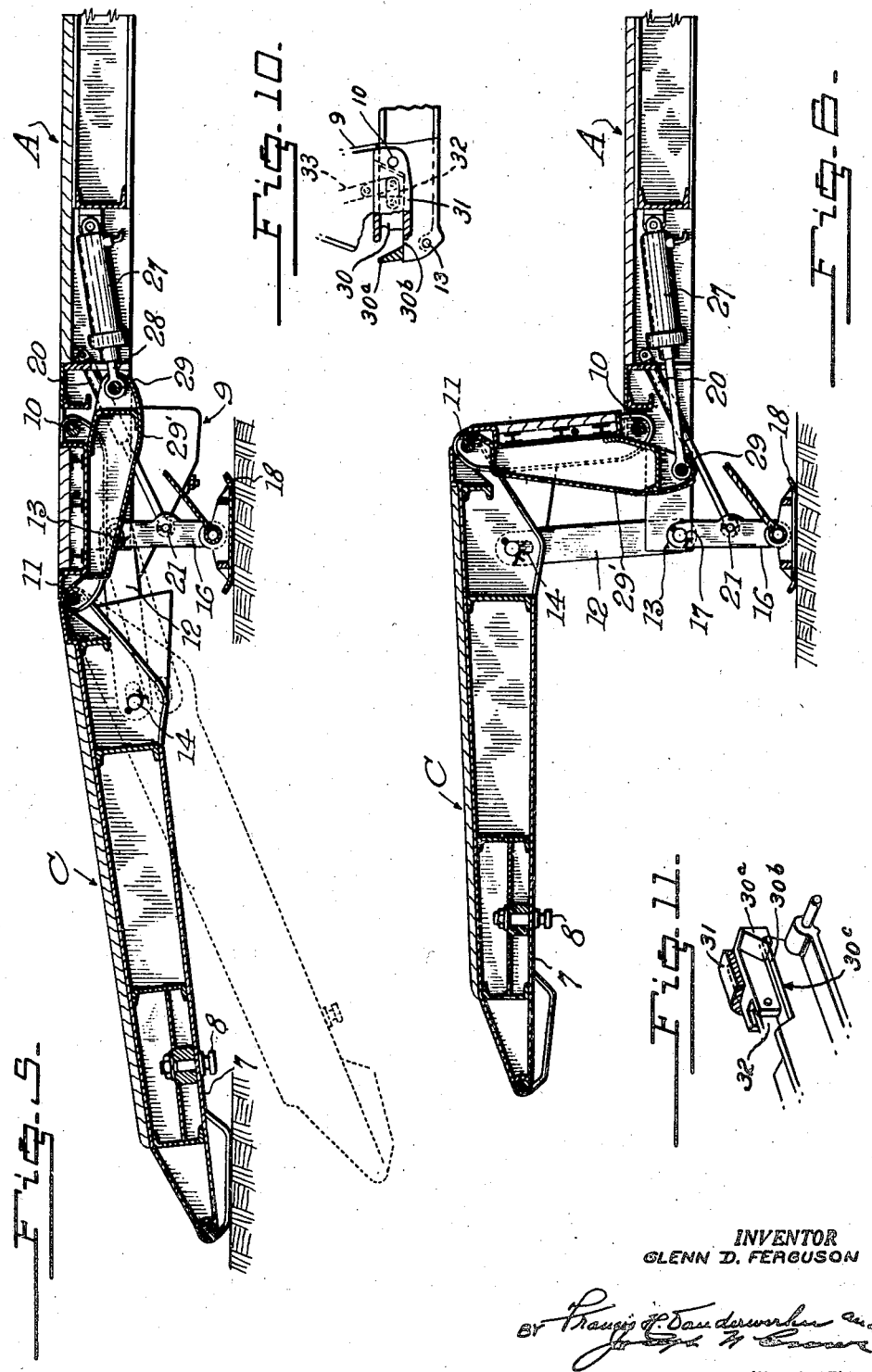

Patented June 22, 1948

2,443,611

UNITED STATES PATENT OFFICE 2,443,611

LOW BED TRAILER

Glenn D. Ferguson, United States Army,
Fort Belvoir, Va.

Application December 7, 1945, Serial No. 633,572

11 Claims. (Cl. 280—33.05)

(Granted under the act of March 3, 1883, as
amended April 30, 1928; 370 O. G. 757)

The invention described herein may be manufactured and used by or for the Government for governmental purposes, without payment to me of any royalty thereon.

This invention relates to trailers, and more particularly to those which have low payload decks, or load-beds, the same being used principally for transporting large, heavy, or unwieldy objects, such as industrial machinery, etc. Tractors of this class are mostly adapted to be supported at their forward ends by the tractor-vehicle which pulls the load.

In the design of low-bed trailers of the type described, the primary objective is to obtain a low center of gravity for the payload, to thereby secure stability in transit. This, of course, may only be accomplished by reducing the level of the load-bed as much as possible while retaining an acceptable amount of mobility, or "floatation."

It is well-known that wheels of large diameter impose less resistance to rotation; and that pneumatic tires of small diameter are not very durable due to the very high ratio of tire flexure in travelling a given linear distance, the latter notwithstanding the use of a large number of tires. In addition, small wheels reduce trailer mobility and speed; make more difficult the installation of brakes of sufficient capacity to meet minimum safety requirements and/or the application of power to the rear axle of the trailer, if such is desired. These difficulties have been overcome to a limited extent in the past by the use of a low-bed trailer frame having a rigid "kick-up," or vertical offset, at both front and rear, the one at the rear providing sufficient road-clearance to accommodate wheels of larger diameter. The kick-up at the forward end is adapted to be supported by the tractor vehicle which pulls the load and the underside of the said forward kick-up is therefore provided with the usual "fifth wheel" or horizontally disposed supporting plate with its centrally disposed king-pin. Obviously, the height of the forward kick-up depends upon the height of the top of the supporting fifth wheel.

Sometimes the load to be carried may be moved over ramps placed against the side of the load-bed; but such side-loading often necessitates the turning of the load at right-angles after it is placed upon the load-bed in order that it be in a suitable riding position, usually a very difficult operation. In addition, side-loading is sometimes impossible, as when the object to be loaded is unusually large, heavy or unwieldy. Because of these objections to side-loading the load is sometimes moved over ramps placed against the rearward kick-up and over the latter and onto the lowered load bed; but in order to resort to this practice it is necessary that the rearward kick-up be very low, as otherwise it would be impossible, or very difficult at best to move the load from the rearward kick-up onto the load-bed.

In the case of either rear-loading or side-loading, the ramps employed are necessarily bulky, heavy and unwieldy, and require several men or crane equipment to handle. If carried on the trailer, such ramps occupy valuable cargo space; and if not so carried the said ramps and crane equipment must be provided at loading and unloading points.

It has been proposed to overcome the troublesome aspects of rear-loading and side-loading by providing in lieu of the usual rigid forward kick-up one which is pivotally attached to the load-bed portion of the frame and susceptible to being lowered into contact with the ground whereupon it may be used as a loading ramp. Such construction provides advantages over some of the devices of the earlier prior art, but has the objection that when used as a loading ramp the pivotally mounted forward kick-up or "gooseneck" as it is sometimes called, provides an angle of approach which is too steep for many types of loads.

It is among the objects of the present invention to provide a trailer of the class described which comprises a low-bed without sacrifice to mobility or "floatation," as accomplished by utilizing wheels of large diameter; while at the same time incorporating therein means for tremendously facilitating loading and unloading. More specifically, the trailer of the invention comprises a rearwardly disposed kick-up of such height as to provide for the accommodation thereunder of a spring-mounted axle-bogie carrying wheels and pneumatic tires of large diameter; together with a pivotally mounted forward kick-up which when in lowered position provides an unusually low angle with respect to the load-bed of the trailer. This low angle is attained by the articulation of the loading ramp, or gooseneck, the manner of which will be specifically described hereinafter.

Another object is to provide a low-bed trailer of the type described which is further characterized by susceptibility to dismantling into such form as to occupy but a minimum of space, whereby it may be easily and economically shipped to a desired point of assembly.

Yet a further object of this invention is to provide a trailer adapted for cross-country travel off of paved road surfaces.

The invention, then, comprises the features hereinafter fully described, and as particularly pointed out in the claims, the following description and the annexed drawings setting forth in detail certain illustrative embodiments of the invention, these being illustrative only.

In the drawing:

Figure 1 is a side elevation of the low-bed trailer of the invention, illustrating in dotted lines a bulldozer disposed in load-carrying position on the load-bed.

Figures 2 and 3 are side elevations of the articulated loading ramp in its elevated and lowered positions, respectively.

Figure 4 is a longitudinal sectional view of a portion of the load-bed of the trailer frame.

Figures 5 and 6 are longitudinal sectional views of the showings of Figures 3 and 2, respectively.

Figure 7 is a schematic plan of an apparatus for supporting the forward end of the load-bed A.

Figure 8 is a perspective illustrating a latching means for holding the loading ramp in its elevated position.

Figure 9 is a plan, partly in section, of a portion of the latching means of Figure 8.

Fig. 10 is a fragmentary sectionized detail, partially in elevation, illustrating the latching means in coacting relation with a portion of the load bed; and Fig. 11 is a fragmentary sectionized perspective view, partially in elevation, illustrating the enlarged lateral offset head of the latching means in coacting relation with a portion of the load bed.

Referring more particularly to the drawings, the letter A designates the load-bed or major portion of the frame of the trailer, the same being flat and comprising a more or less conventional combination of longitudinal and transverse elements.

At its rearward end, the load-bed A has detachably secured thereto a kick-up, or vertically offset portion B, the same comprising, an upward extension of substantial height and a substantially longer, horizontal platform. Like the load-bed, A, the kick-up B is made up of any suitable combination of longitudinal and transverse elements. The point of attachment of the kick-up B to the load-bed A is indicated at 2, the specific attaching means comprising nuts and bolts (not shown) or the equivalent thereof.

As shown most clearly in Figure 1, the bottom of the horizontal platform of the kick-up, or vertically offset portion B, is considerably higher than the bottom of the load-bed A, thereby providing materially increased road-clearance at this point. This construction and arrangement enables the establishment of a very low center of gravity for the load on the load-bed A, while permitting the kick-up B to accommodate thereunder a sizable spring-mounted dual axle-bogie 4 which carries pneumatically-tired wheels 5 of large diameter, the space limitations being such as to permit substantial oscillatory movement on the part of the said spring-mounted axle-bogie and pneumatically-tired wheels.

To the forward end of the load-bed A there is detachably secured the pivotally mounted combined forward kick-up and loading ramp C and its associated connecting and draw-bar facilities, the said facilities comprising the usual bearing plate, or "fifth wheel," and king-pin. More specifically, the forward kick-up, or vertical offset C comprises an upward extension of substantial height and a substantial longer horizontal platform, the latter carrying on its underside the fifth wheel and king-pin, which are respectively indicated at 7 and 8.

According to the teachings of the present invention, the combined forward kick-up and loading ramp C is articulated by pivotally connecting the bottom of its upward extension to the forward end of the load-bed A; and by pivotally connecting the top of the said upward extension to the rearward end of the adjacent horizontal platform. As in the case of the previously described load-bed A and rearward kick-up B, the two component pivotal elements of the combined forward kick-up and loading ramp C are formed of suitable longitudinal and transverse elements. However, each of the side edges of the upward extension of the forward kick-up C comprises a vertically disposed substantially triangular plate 9. The inner corners of the bases of the vertically disposed triangular plates 9 are pivotally connected to the sides of the load-bed A at points 10 which are somewhat adjacent, but spaced from, the forward end of the latter, while the apices of the said triangular plates 9 are pivotally connected to the rearward extremity of the adjacent horizontal platform, as shown at 11.

Referring to Figures 3 and 4, a pair of links 12 are pivotally connected between the forward extremity of the load-bed A and points which are adjacent to, but spaced from, the rearward end of the forward horizontal platform, the said points of pivotal attachment being respectively indicated at 13 and 14, the latter being modified into a pin-and-slot arrangement, as shown.

From the foregoing it will be perceived that when the articulated combined forward kick-up and loading ramp is in the position shown in Figures 2 and 4, and coupled to the tractor vehicle as shown in Figure 1, the triangular plates 9 (and their associated reinforcing elements) serve as compression members, and the pivotal links 12 serve as tension members. The pin-and-slot arrangement 14 provides sufficient lost-motion to permit accommodation to uneven ground when lowered, as shown in Figure 3.

When the combined forward kick-up and loading ramp C is in its lowered position, it is, of course, necessary to support the forward end of the load-bed at a suitable elevation; and various means may be employed for this purpose. Preferably, but not necessarily, the forward end of the load-bed A may carry a pair of spaced and parallel pedestals 16 which are pivotally mounted, as at 17, and adapted to assume a depending position, as shown in Figures 3 through 7. At their lower ends, the pedestals carry a pivotally mounted common pad 18 which is sufficiently elongate to extend between them. Adjacent each of the pedestals 16, the forward end of the load-bed A carries a fluid cylinder 20, the operating rod of which is pivotally connected, as at 21, to the mid-portion of the proximate pedestal. Through the agency of a suitably operated hydraulic pump 22, and connecting conduits, the pedestals 16 and their connected pad 18, are moved into the lowered position shown. The return of the pedestals 16 and the pad 18 to retracted positions under the forward end of the load-bed A is accomplished by tension springs 24 and cables 25 which are connected to the pedestals 16 adjacent their lower ends; it being understood, of course, that the said springs and cables will not perform their function of retracting the pedestals and pad until fluid has been released from the fluid cylinders 20.

After the pedestals 16 and their associated pad 18 are sufficiently lowered, the tractor-vehicle (Figure 1) is disconnected and removed; at which time the articulated combined forward kick-up and loading ramp C may be lowered into its load-receiving position with the forward end thereof in contact with the ground. Referring to Figures 6 and 7, a hydraulic ram 27 is pivotally mounted on the underside of the load-bed A adjacent the previously-described fluid cylinders 20. The operating rod of this hydraulic ram carries a yoke 28 which is pivotally connected by a pin 29, to an operating arm 29', the latter rigidly secured to the forward kick-up and mounted midway between the outer ends of the bases of the triangular plates 9, as shown in Figures 6 and 7. Upon releasing fluid from the hydraulic ram 27 the combined forward kick-up and loading ramp C will slowly settle into the lowered position (Figures 3 and 5); and return to raised position (Figures 2 and 6) by pumping fluid into the said ram.

Referring to Figures 2, 3 and 8, the articulated combined forward kick-up and loading ramp is maintained in raised, or elevated, position by means of a latching means of simple design. This latching means may acceptably take the form of a pair of latches 30 each of which slides in a case 31 formed in one of the substantially triangular side plates 9. Both of the latches 30 have enlarged heads, as shown at 30ª, which are adapted to coact with cutout portions 30ᶜ located at the forward extremities of the side members of load bed A, as clearly shown in Figs. 10 and 11 of the drawings. By this construction, when latches 30 are in their latching position to maintain the forward kick-up and loading ramp in raised position, heads 30ª abut the edges 30ᵇ of said cutout portions 30ᶜ, as shown in Figs. 10 and 11 of the drawings. To release latches 30, they are actuated by suitable mechanism, hereinafter to be described, until the heads 30 leave the edges 30ᵇ and pass over the ends of the side members of load bed A, as will be understood without further discussion. Each of the latches 30 is moved forwardly and backwardly in its case 31 through a yoke 32 which straddles the lower end of a lever 33 which is pivoted intermediate its ends to the adjacent side plate 9, as shown at 34. When the combined forward kick-up and loading damp C is in its elevated position, these pivoted levers 33 assume vertical positions, as shown in Figures 2 and 8.

Between the side plates 9 there extends a rotatable shaft 35 to which there is secured a pair of short levers 36, one being adjacent to each of the longer pivoted levers 33. The upper portion of each of the pivoted levers 33 is connected to the free end of the most adjacent relatively shorter lever 36 through a link 38. Attached to the upper end of one of the pivoted levers 33 is a handle 39 which projects through a slot 40 in the adjacent side plate 9. Through the agency of this handle 39 the latches 30 may be moved forwardly until their heads 30ª leave edges 30ᵇ of cutout portions 30ᶜ and pass over the forward ends of the side members of load bed A. This movement of the latches 30 will unlatch triangular plates 39, permit their rotation about pivot points 10, and enable descent of the combined forward kick-up and loading ramp to the positions shown in Figs. 3 and 5. Pivoted levers 33 are resiliently influenced forwardly to draw the latches 30 within their cases 31 and into the aforesaid cutout portions 30ᶜ through a conventional spring device 41, which is provided with the usual adjusting device 42.

In the light of the preceding description, it will be apparent that, assuming that the hydraulic pump 22 has been suitably manipulated to permit release of operating fluid from the hydraulic ramp 27, actuation of handle 39 will cause the enlarged heads 30ª of latches 30 to pass over the ends of the side members of load bed A, whereupon the combined forward kick-up and loading ramp C will slowly descend to the positions shown in Figs. 2 and 5 of the drawings, as previously stated. Admission of operating fluid to hydraulic ramp 27 will, through the connections hereinbefore specified, elevate ramp C to the positions shown in Figs. 3 and 6 of the drawings. As the loading ramp C attains its raised or elevated position, the enlarged heads 30ª of latches 30, passing over the ends of the side members of the load bed and into abutting relation with the edges 30ᵇ of cutout portions 30ᶜ, will lock and maintain said loading ramp C in its raised position.

Having thus described my invention, what I claim as new and wish to secure by Letters Patent is:

1. In a trailer, a main frame providing a load-bed, a rearward kick-up vertically offset with respect to and rigidly connected with said main frame, said rear kick-up providing substantially increased road-clearance, a spring-mounted running gear disposed under said rearward kick-up, including pneumatic tires of large diameter, and a combined forward kick-up and loading ramp pivotally connected to the forward end of said load-bed.

2. In a trailer, a main frame providing a load-bed, a rearward kick-up vertically offset with respect to and rigidly connected with said main frame, said rear kick-up providing substantially increased road-clearance, a spring-mounted running gear disposed under said rearward kick-up, and having pneumatic tires of large diameter, and a combined forward kick-up and loading ramp pivotally connected to the forward end of said load-bed and articulated to provide a flat loading angle of approach.

3. In a trailer, a main frame providing a load-bed, a rearward kick-up vertically offset with respect to the general plane of and detachably connected to said load-bed said rearward kick-up providing substantially increased road clearance, spring mounted running gear disposed under said kick-up, including pneumatic tires of large diameter, and a combined forward kick-up and loading ramp pivotally connected to the forward end of said load-bed.

4. In a trailer, a main frame including a load-bed provided with parallel side pieces each of said side pieces being formed at one end with a cut-out portion, the cut-out portions of the respective pieces being oppositely disposed, running gear supporting one end of said frame, and combined hitch and ramp means mounted at the other end of said frame adapted for coupled engagement with a tractor vehicle, said means being movable to a transport position such that said means is elevated for said coupled engagement with a tractor vehicle and being movable to a loading position such that said means is lowered whereby the end thereof may rest on the ground and the means serve as a ramp, fluid operable means for effecting the movement of said hitch and ramp means, and latch means for releasably securing said hitch and ramp means in said transport position, said latch means including slidable heads adapted to engage the edges of said side pieces, said heads being operable over the ends of said side pieces and into and out of the cut-out portions thereof and means in connection with said heads for imparting sliding movement thereto.

5. In a trailer, a main frame including a load-bed provided with parallel side pieces each of said pieces being formed at one end with a cut-out portion, the cut-out portions of the respective pieces being oppositely disposed, a hitch and ramp member having means for coupling same to a tractor vehicle, said member having a deck for supporting objects to be loaded onto the trailer, a link structure connecting said member and said frame, said member and said structure being movable to a position such that said hitch and ramp member extends in a plane above said frame convenient for coupling same to a tractor vehicle and being movable to a position such that said hitch and ramp member and said structure extends below said frame in a plane angularly disposed to the plane of the load-bed whereby the ramp and hitch member may rest on the ground and the ramp and hitch member and said structure serve as a ramp for loading and unloading the trailer, latch means for releasably securing said hitch and ramp member and said structure in said first mentioned position, said latch means including slidable heads adapted to engage the edges of said side pieces, said heads being operable over the ends of said side pieces into and out of the cut-out portions thereof, means in connection with said heads for imparting sliding movement thereto and fluid operable means for effecting the movement of said hitch and ramp member and said structure.

6. In a trailer, the combination of a carrying bed, a forward structure connected with said bed to provide a hitch when disposed in one position relative to said bed, said structure functioning as a ramp approach to the bed when disposed in another position with respect to said bed, power operated mechanism connected with said forward structure to actuate the latter from one to the other of said positions, releasable latch means to lock and hold said structure when moved into one of its aforesaid positions, a rearward structure detachably connected with the rear of said carrying bed, said rearward structure being vertically offset with respect to the general plane of said carrying bed to provide increased road clearance, and a spring mounted running gear disposed under said rearward structure and having pneumatic tires of large diameter.

7. In a trailer the combination with a loading bed provided with parallel side pieces, each of said side pieces being formed at one end with a cut-out portion, the cut-out portions of the respective pieces being oppositely disposed, a structure connected with the front end of said bed, said structure being adjustable to provide a hitch when in raised and a loading ramp when in lowered position and means in connection with said bed and structure to raise and lower the latter; of a latch mechanism for locking said structure in one of its positions, said mechanism including slidable heads adapted to engage the edges of said side pieces, said heads being operable over the ends of said side pieces and into and out of the cut-out portions thereof and means in connection with said heads for imparting sliding movement thereto.

8. In a trailer the combination with a loading bed provided with parallel side pieces, each of said side pieces being formed at one end with a cut-out portion, the cut-out portions of the respective pieces being oppositely disposed, a structure connected with the front end of said bed, said structure being adjustable to provide a hitch when in raised and a loading ramp when in lowered position and means in connection with said bed and structure to raise and lower the latter; releasable latch means for locking said structure in one of its positions, said means including slidable latch elements provided with laterally offset heads adapted to engage the edges of said side pieces, said heads being operable over the ends of said side pieces and into and out of the cut-out portions thereof as sliding movement is imparted to said latch elements and means in connection with said latch element to cause the sliding movement.

9. In a trailer the combination with a loading bed provided with parallel side pieces, each of said side pieces being formed at one end with a cut-out portion, the cut-out portions of the respective pieces being oppositely disposed, a structure connected with the front end of said bed, said structure being adjustable to provide a hitch when in raised and a loading ramp when in lowered position and means in connection with said bed and structure to raise and lower the latter; of releasable latch means for locking said structure in one of its positions, said means including slidable latch elements provided with laterally offset heads adapted to engage the edges of said side pieces, said heads being operable over the ends of said side pieces into and out of the cut-out portions thereof and manually controlled means in connection with said latch elements for imparting sliding movement thereto.

10. In a trailer the combination with a loading bed provided with parallel side pieces, each of said side pieces being formed at one end with a cut-out portion, the cut-out portions of the respective pieces being oppositely disposed, a structure connected with the front end of said bed and adjustable relative thereto to provide a hitch when in raised and a loading ramp when in lowered position and link mechanism in connection with said bed and structure to raise and lower the latter, said mechanism including parallel plates; of a releasable latch means for locking said structure in one of its positions, said means including slidable latch elements carried by said parallel plates, said elements being formed with laterally offset heads adapted to engage the edges of said side pieces and operable over the ends of said side pieces into and out of the cut-out portions thereof, and an operating lever pivotally attached to one of said parallel plates and connected at its lower end with said latch elements for imparting sliding movement thereto, and a hand grip means attached to the free end of said lever and extending through an opening in said parallel plate to the exterior thereof.

11. In a trailer the combination with a loading bed provided with parallel side pieces, each of said side pieces being formed at one end with a cut-out portion, the cut-out portions of the respective pieces being oppositely disposed, a structure connected with the front end of said bed and adjustable relative thereto to provide a hitch when in raised and a loading ramp when in lowered position and link mechanism in connection with said bed and structure to raise and lower the latter, said mechanism including parallel plates; of a releasable latch means for locking said structure in one of its positions, said means including slidable latch elements carried by said parallel plates, said elements being formed with laterally offset heads adapted to engage the edges of said side pieces and operable over the ends of said side pieces into and out of the cut-out portions thereof, an operating lever pivotally attached to one of said plates and connected with said latch elements to impart sliding movement thereto and spring means connected with said lever for normally retaining the heads of said latch elements in the cut-out portions of said side pieces.

GLENN D. FERGUSON.

REFERENCES CITED

The following references are of record in the file of this patent:

UNITED STATES PATENTS

| Number | Name | Date |
| --- | --- | --- |
| 2,131,949 | Helmig | Oct. 4, 1938 |